(12) United States Patent  
Venkitachalam et al.

(10) Patent No.: US 8,151,263 B1  
(45) Date of Patent: Apr. 3, 2012

(54) REAL TIME CLONING OF A VIRTUAL MACHINE

(75) Inventors: Ganesh Venkitachalam, Mountain View, CA (US); Alexander Moshchuk, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 1184 days.

(21) Appl. No.: 11/725,889

(22) Filed: Mar. 19, 2007

Related U.S. Application Data

(60) Provisional application No. 60/788,298, filed on Mar. 31, 2006.

(51) Int. Cl.  
*G06F 9/455* (2006.01)  
*G06F 9/46* (2006.01)

(52) U.S. Cl. ............. 718/1; 718/100; 711/6; 711/162; 714/15

(58) Field of Classification Search .................. 718/1  
See application file for complete search history.

(56) References Cited

U.S. PATENT DOCUMENTS

| | | | |
|---|---|---|---|
| 5,852,715 A | 12/1998 | Raz et al. | |
| 6,625,623 B1 | 9/2003 | Midgley et al. | |
| 6,789,156 B1 * | 9/2004 | Waldspurger | 711/6 |
| 7,213,246 B1 | 5/2007 | van Rietschote et al. | |
| 7,370,164 B1 | 5/2008 | Nagarkar et al. | |
| 7,484,208 B1 | 1/2009 | Nelson | |
| 7,802,302 B1 | 9/2010 | Nagarkar et al. | |
| 2004/0010787 A1 | 1/2004 | Traut et al. | |
| 2005/0027749 A1 * | 2/2005 | Ohno et al. | 707/200 |
| 2005/0108407 A1 * | 5/2005 | Johnson et al. | 709/228 |
| 2006/0085792 A1 * | 4/2006 | Traut | 718/100 |
| 2006/0101189 A1 * | 5/2006 | Chandrasekaran et al. | 711/6 |
| 2006/0184935 A1 | 8/2006 | Abels et al. | |
| 2007/0079307 A1 * | 4/2007 | Dhawan et al. | 718/1 |
| 2007/0097992 A1 * | 5/2007 | Singh et al. | 370/395.54 |
| 2009/0300605 A1 | 12/2009 | Edwards et al. | |

* cited by examiner

*Primary Examiner* — Kenneth Tang

(57) ABSTRACT

Method and systems for real-time cloning of a virtual machine are described. A virtual machine is running and a clone of the virtual machine is created while the virtual machine continues to run. In one embodiment, the creation of the clone further comprises quiesceing the virtual machine, taking a snapshot S1 (excluding main memory) of the state of the virtual machine, and creating a copy S2 of the snapshot S1. The original VM continues execution off the snapshot S1. The cloned VM restores from snapshot S2. In another embodiment, the cloning of the virtual machine further comprises instructing a vmkernel associated with the virtual machine to mark all pages of main memory of the virtual machine as copy-on-write (COW). The unique ID corresponding to the main memory is provided by the vmkernel and an association between the unique ID and the main memory is made upon restoration of the clone.

25 Claims, 9 Drawing Sheets

REAL TIME CLONING OF A VIRTUAL MACHINE

TECHNICAL FIELD

This application claims the benefit of the filing date of the provisional Application U.S. Ser. No. 60/788,298, filed Mar. 31, 2006.

The invention relates to virtual machines. More specifically, the present invention relates to real time cloning of a virtual machine.

BACKGROUND

Frequently, computers are dedicated to individuals or to specific applications. For example, an individual owns or is assigned his or her own personal computer (PC). Each time a business hires an employee whose job entails access to a computer; a new PC would be purchased and installed for that new hire. In other cases, a PC or server may be used to perform a specific task. For example, a corporation could have a server for hosting the company's web site, another server for handling emails, and yet another server for handling financial transactions. This one-to-one correlation was simple, straightforward, flexible, and readily upgradeable. However, one drawback to this set-up is that it is inefficient from a computer resource perspective.

The inefficiency stems from the fact that most software applications do not fully utilize the full processing potential of the computer upon which that software is installed. The processing power of a computer is largely defined by its interconnected hardware components. However, when creating software, programmers do not know the specific hardware capabilities of the computers upon which their software is to be ultimately installed upon. Consequently, programmers tends to be extremely conservative when creating software in order to ensure that software can run on the vast majority of conventional, contemporary PCs or servers. As a result, software applications do not push the envelope set by hardware constraints. Furthermore, some applications may consume a great deal of processing power, while other computer applications are inherently less computing intensive. When the PC or server is running less computationally intensive applications, much of its hardware resources are underutilized. Furthermore, given hundreds or thousands of computers networked in an enterprise, the cumulative effect of the amount of wasted computing resources adds up.

In an effort to take advantage of all the underutilized computing resources, there have been efforts to design "virtual" machines. The concept of virtualization broadly describes the separation of a resource (e.g., computing resource) and/or request for a service from the underlying physical delivery of that service. In one example, with regards to virtual memory, computer software gains access to more memory than is physically installed, via the background swapping of data to disk storage. Similarly, virtualization techniques is applied to other IT infrastructure layers such as networks, storage, laptop hardware, server hardware, operating systems, and/or applications.

Through virtualization, the virtual infrastructure provides a layer of abstraction between computing, storage, networking hardware, and the applications running on it and enables a more efficient utilization of computing resources. In general, before virtualization, a single computer is associated with a single operating system image. The machine's hardware and software is tightly coupled and running multiple applications on the same machine can create conflict. Moreover, the machine is often underutilized and inflexible, which all leads to an inefficient use of computing resources. In contrast, with virtualization, operating system and applications are no longer tightly coupled to a particular set of hardware. Advantageously, the virtualized infrastructure allows IT administrators to managed pooled resources across an enterprise, creating a more responsive and dynamic environment.

Basically, a virtual machine entails loading a piece of software onto a physical "host" computer so that more than one user can utilize the resources of that host computer. In other words, the virtual software package is loaded onto one or more physical host computers so that the processing resources of the host computers can be shared amongst many different users. By sharing computing resources, virtual machines make more efficient use of existing computers. Moreover, each user accesses the host computer through their own virtual machine. From the viewpoint of the user, it appears as if they were using their own computer. Users can continue to operate in a manner that they had grown accustomed to in interacting with computers. Thus, rather than buying, installing, and maintaining new computers, companies can simply load virtual machine software to get more leverage off their existing computers. Furthermore, virtual machines do not entail any special training because they run transparent to the user. In addition, virtual machines have the ability to run multiple instances of different operating systems concurrently on the same host or a group of hosts.

Amongst the benefits that virtual machines provide, one that a user may find particularly useful is the ability to replicate or clone a virtual machine. For example, a user that wants to run a backup application on the original virtual machine can run the backup application on the cloned virtual machine instead. By running the backup application on the cloned virtual machine, a user can leave the operations running on the original virtual machine uninterrupted.

In one example, the original virtual machine is running on a first host computer having a first set of computing resources and the cloned virtual machine is running on a second host computer having a second set of computing resources. Hence, an operation (e.g., a data mining operation) can be performed on the cloned virtual machine without draining the computing resources from the original virtual machine. In other examples, a user can perform other types of operations, such as scanning for viruses, running simulations, performing tests for new applications programs, mining data, and/or monitoring certain functions on the cloned virtual machine without draining computing resources from the original virtual machine.

However, under traditional approaches, in order to clone an original virtual machine, the original virtual machine has to be shut-down before a replica or clone can be created. This is inconvenient and/or inefficient because shutting-down the original virtual machine causes an interruption to the functions that it serves. In one example, the original virtual machine may be a server dedicated to taking orders from online customers. Periodically, the original virtual machine would need to run backup operations to guard against possible system crashes that could lead to loss of data. Because running backup operations on the original virtual machine is both time consuming and drains a significant amount of computing resources, running backup operations on a clone is often preferred. Unfortunately, under traditional methods, the original virtual machine (e.g., a server) has to be shut-down before a clone can be created. However, this is undesirable because shutting-down the original virtual machine may interrupt a customer's shopping experience and lead to loss of sales for a corporation.

SUMMARY

Methods and systems for a real-time cloning of a virtual machine are described. In one embodiment, the method includes running the virtual machine and creating a clone of the virtual machine while the virtual machine continues to run. In one embodiment, the creation of the clone further comprises quiesceing the virtual machine, taking a snapshot S1 (excluding main memory) of the state of the virtual machine, and creating a copy S2 of the snapshot S1. The original VM continues execution off the snapshot S1. The cloned VM restores from snapshot S2. In one embodiment, the cloning of the virtual machine further comprises instructing a vmkernel associated with the virtual machine to mark all pages of main memory of the virtual machine as copy-on-write (COW). The unique ID corresponding to the main memory is provided by the vmkernel and an association between the unique ID and the main memory is made upon restoration of the clone. By allowing virtual machines to be cloned in real-time, embodiments help reduce inefficiencies associated with cloning of virtual machines.

DETAILED DESCRIPTION OF THE DRAWINGS

Figure 1:
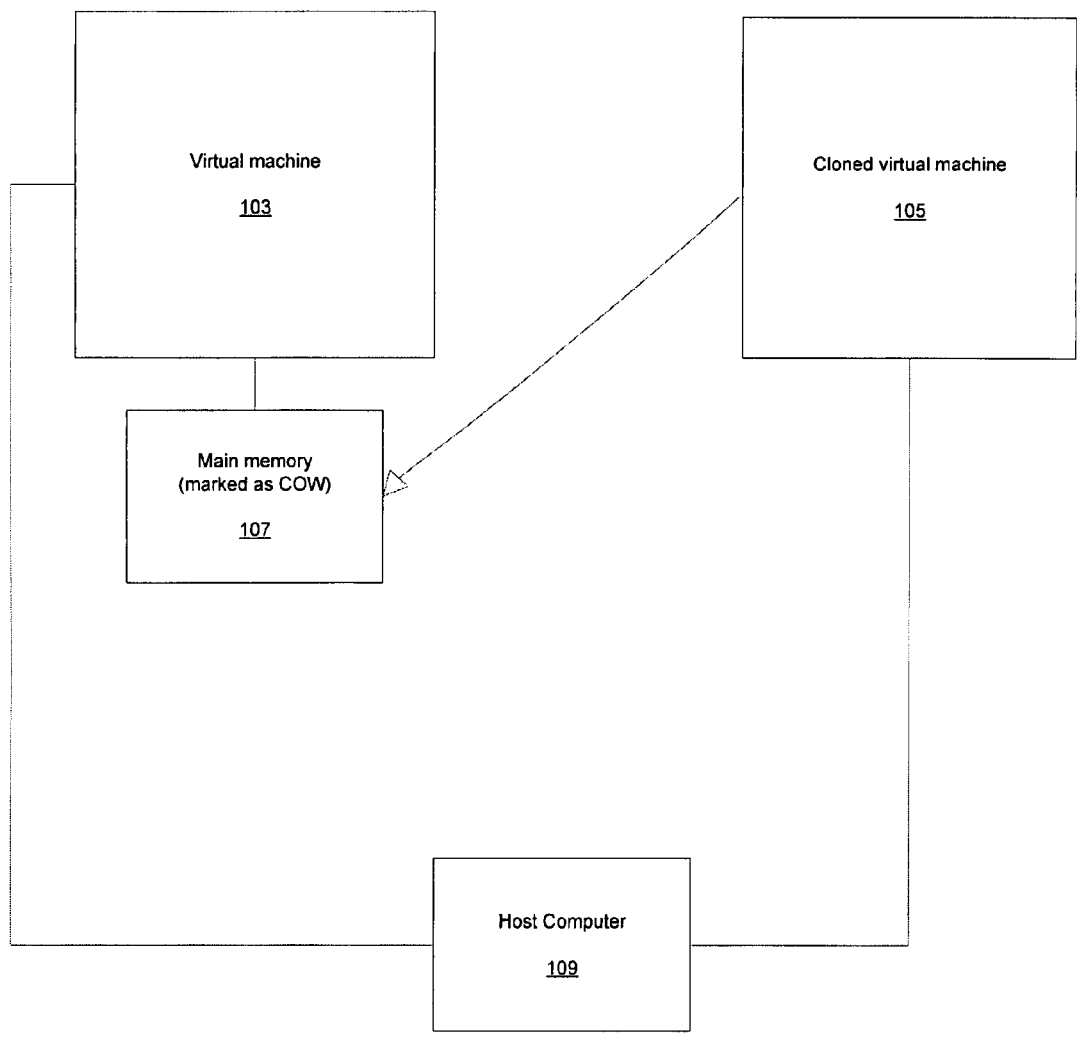
FIG. 1 illustrates block diagrams of a real-time cloning system, upon which embodiments can be implemented.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

A replica or a clone of a virtual machine is desirable in a variety of circumstances. For example, a clone that has the same state information as the original virtual machine allows a user to perform a backup operation on the clone without interrupting the original virtual machine. In other examples, a clone can be utilized to perform other functions, such as but not limited to: load balancing, offloading, pre-deployment testing, speculative execution, data mining, virus scanning, monitoring, and/or simulating.

Nevertheless, under conventional methods, the original virtual machine has to be shut down before a clone can be created, which means the operations being executed on the original virtual machine has to be stopped and cannot be restarted until the cloning or replicating is complete. Not only does this take time, it negatively impacts the overall efficiency of the system, which contradicts the purpose of using virtual machines.

By allowing virtual machines to be cloned in real-time, embodiments help to appreciably reduce inefficiencies associated with cloning of virtual machines. For example, real-time cloning methods can be faster and cause fewer interruptions when compared to traditional cloning methods that require shutting down the original virtual machine. Hence, real-time cloning methods may allow the original virtual machine to continue to run practically unaffected while a clone is created.

In contrast to conventional approaches, embodiments set forth real time methods for cloning a virtual machine. In one embodiment, the method includes running the virtual machine and creating a clone of the virtual machine while the virtual machine continues to run. In one embodiment, the creation of the clone further comprises quiesceing the virtual machine, taking a snapshot S1 (excluding main memory) of the state of the virtual machine, and creating a copy S2 of the snapshot S1. A unique ID corresponding to the main memory is provided by the vmkernel and an association between the unique ID and the main memory is made upon restoration of the clone. The original VM continues execution off the snapshot S1. The cloned VM restores from snapshot S2. In one embodiment, the cloning of the virtual machine further comprises instructing a vmkernel associated with the virtual machine to mark all pages of main memory of the virtual machine as copy-on-write (COW).

FIG. 1 illustrates block diagrams of a real-time cloning system 101, upon which embodiments can be implemented. Real-time cloning system 101 includes a virtual machine 103, main memory 107, cloned virtual machine 105, and host computer 109.

Although system 101 is shown and described as having certain numbers and types of elements, the embodiments are not necessarily limited to the exemplary implementation. That is, system 101 can include elements other than those shown, and can include more than one of the elements that are shown. For example, system 101 can include a greater or fewer number of host computers than the one host computer (host computer 109) shown. For example, system 101 can include a second host computer having hardware components separate from that of host computer 109 to support cloned virtual machine 105.

In one example, virtual machine 103 (e.g., a server) is running on host computer 109. Main memory 107 is coupled with the virtual machine 103. A clone of the virtual machine 103 is desired. A cloned virtual machine 105 is created while the virtual machine 103 continues to function. Upon creation, the cloned virtual machine 105 is restored.

In one embodiment, the creation of the cloned virtual machine 105 includes quiesceing the virtual machine 103 (e.g., suspending all I/O operations), taking a snapshot S1 of the state of the virtual machine 103 (e.g., a snapshot excluding main memory of the virtual machine), and creating a copy S2 of the snapshot S1. The original virtual machine continues execution off snapshot S1 and the cloned virtual machine restores from the snapshot S2.

In one embodiment, the cloning of the virtual machine 103 also includes instructing a vmkernel (not shown in FIG. 1) associated with the virtual, machine 103 to mark all pages of main memory 107 coupled with the virtual machine 103 as copy-on-write (COW). A unique ID corresponding to the main memory 107 is provided by the vmkernel and an association between the unique ID and the main memory 107 is made upon restoration of the cloned virtual machine 105.

By cloning virtual machine 103 (e.g., a server) in real-time, inefficiencies associated with cloning of the virtual machine 103 is reduced. With conventional methods of cloning, virtual machine 103 would have to be shut-down before a replica can be created. In contrast, system 101 enables a cloned virtual machine 105 to be created with little or no interruption to virtual machine 103.

FIGS. 2A, 2B, 2C, and 2D illustrate flowcharts 2010, 2210, 2230, and 2250 of methods for real-time cloning of a virtual machine, upon which embodiments can be implemented. Although specific steps are disclosed in flowcharts 2010, 2210, 2230, and 2250, such steps are exemplary. That is, embodiments are well suited to performing various other or additional steps or variations of the steps recited in flowcharts 2010, 2210, 2230, and 2250. The steps in flowcharts 2010, 2210, 2230, and 2250 can be performed in orders different than presented.

Figure 2A:
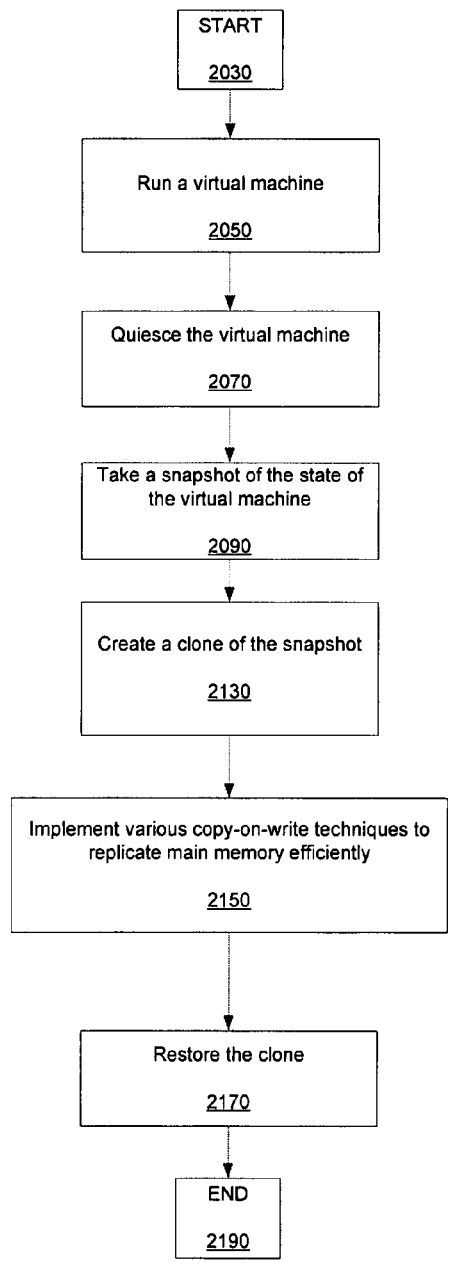
FIG. 2A illustrates flowcharts of methods for real-time cloning of a virtual machine, including instructing a vmkernel associated with the virtual machine to mark all pages of main memory of the virtual machine as copy-on-write (COW), upon which embodiments can be implemented.
Figure 2B:
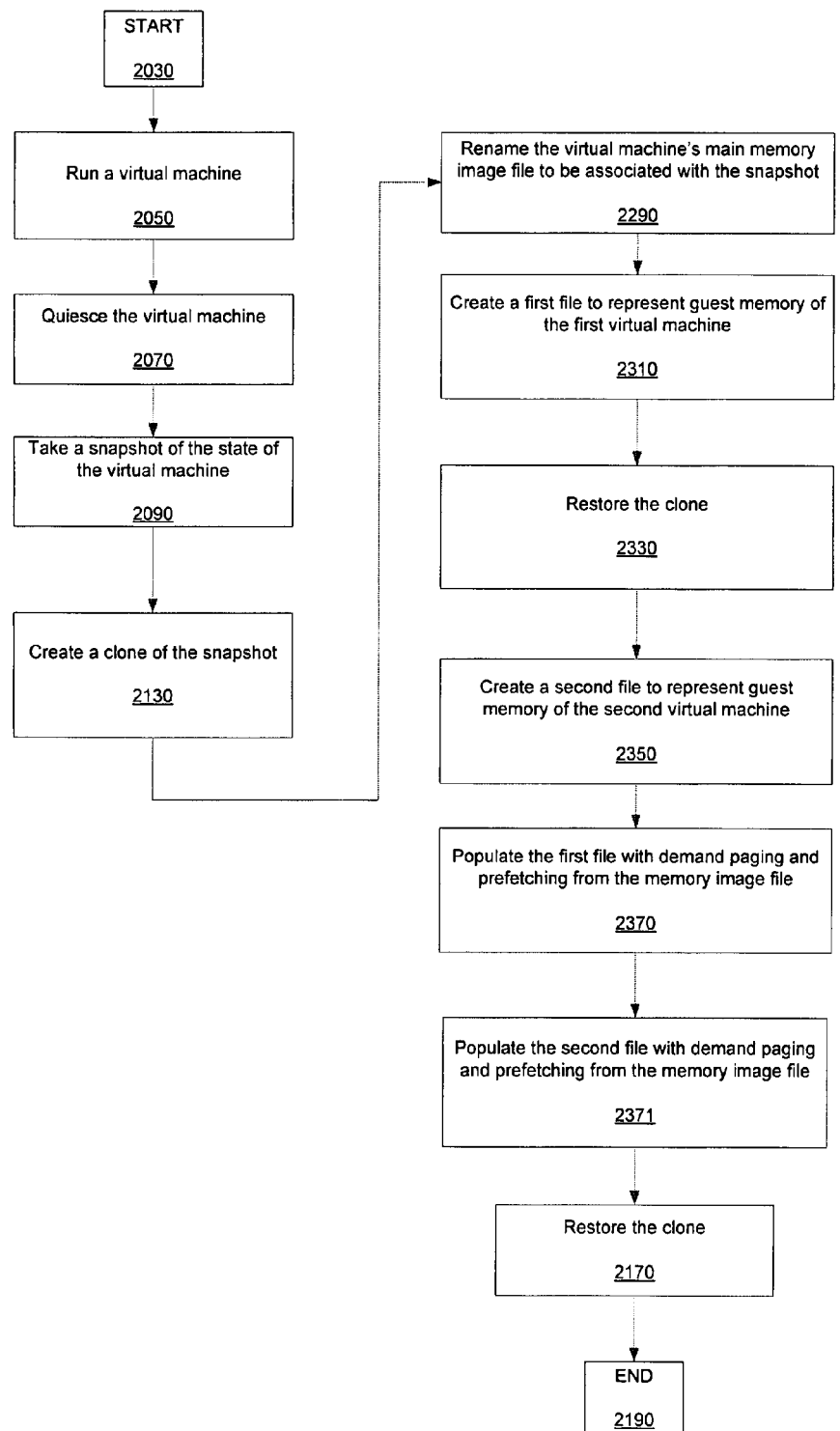
FIG. 2B illustrates flowcharts of methods for real-time cloning of a virtual machine, including renaming the virtual machine's main memory to a memory image file of a snapshot, upon which embodiments can be implemented.
Figure 2C:
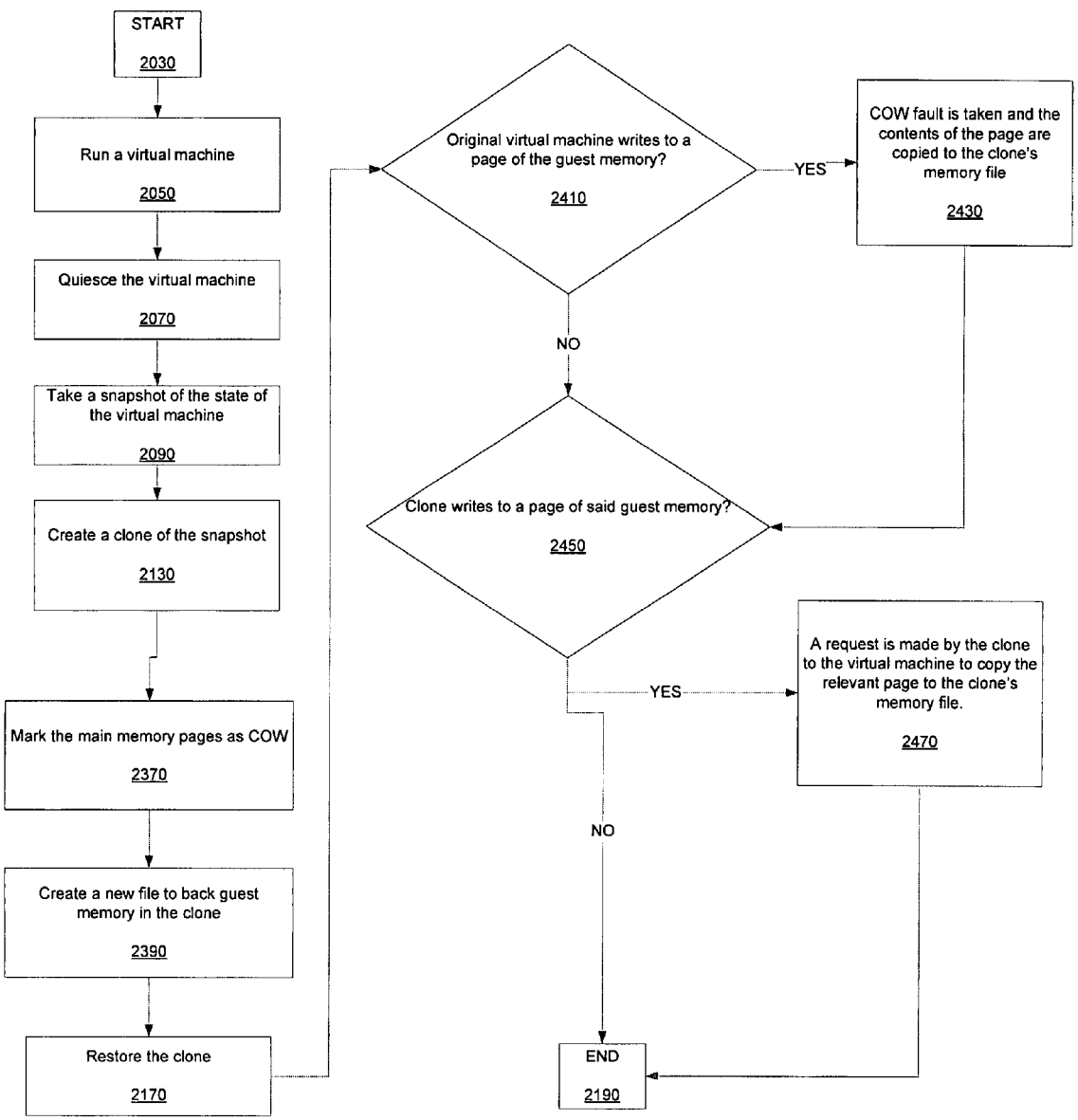
FIG. 2C illustrates flowcharts of methods for real-time cloning of a virtual machine, including taking a COW fault, upon which embodiments can be implemented.
Figure 2D:
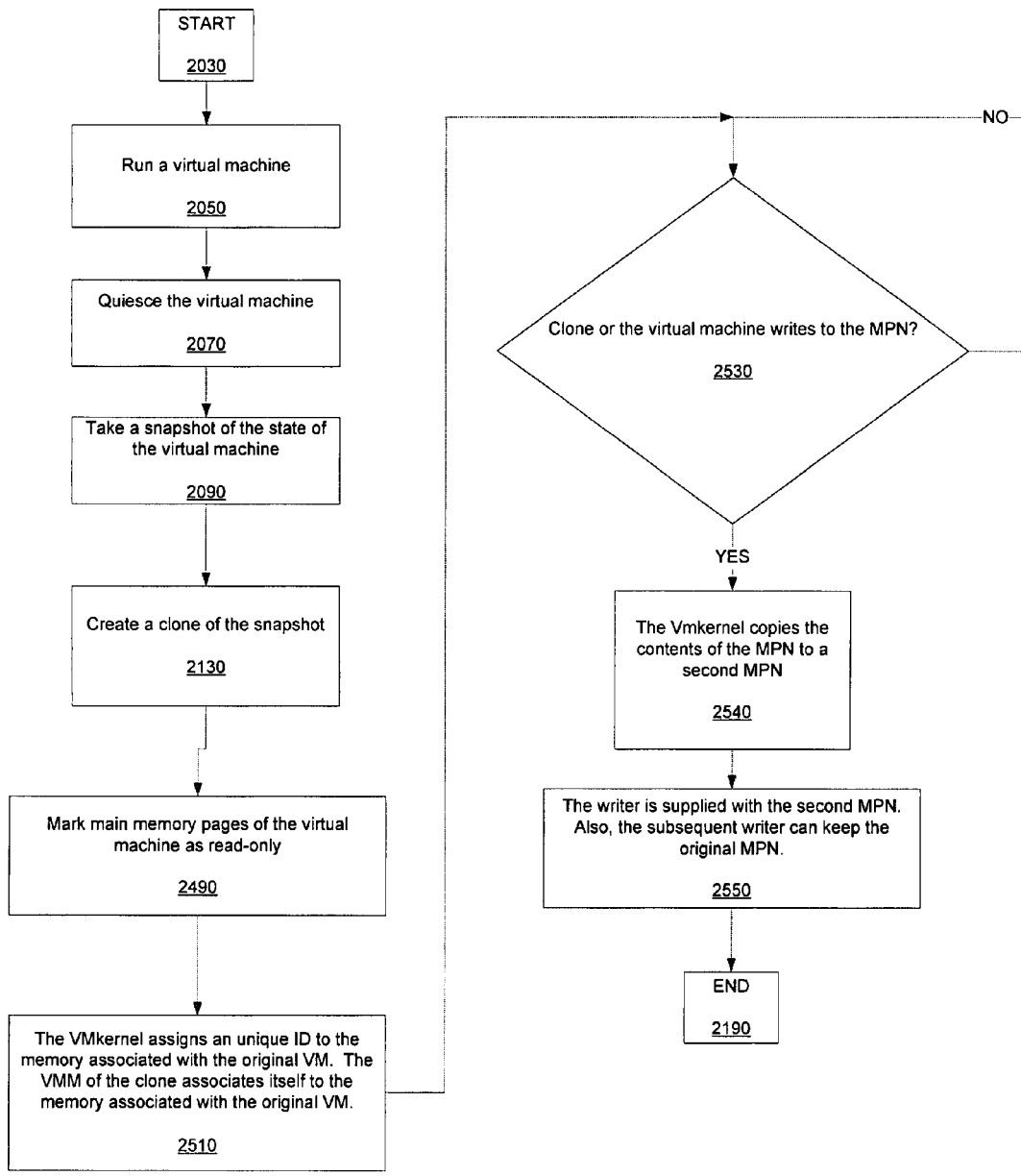
FIG. 2D illustrates flowcharts of methods for real-time cloning of a virtual machine, including marking the main memory of the virtual machine as read-only, upon which embodiments can be implemented.

With reference to FIG. 2A, at block 2030, the process starts. At block 2050, a virtual machine (e.g., a server) is run. At block 2070, the virtual machine is quiesced. In one example, the quiesced virtual machine has temporarily suspended all I/O operations. At block 2090, a snapshot S1 of the state of the virtual machine is taken. The snapshot S1 does not include the state of the main memory. In one embodiment, the snapshot S1 includes an associated configuration file and a saved state of the virtual machine. In another embodiment, the snapshot S1 creates a redo log associated with the virtual machine. At block 2130, a clone of the snapshot is created. The original VM continues execution off snapshot S1 and resume execution. At block 2150, various copy-on-write techniques are implemented to replicate main memory efficiently. FIGS. 2B, 2C, and 2D describe the various COW techniques in greater detail. At block 2170, the cloned virtual machine is restored from S2 and resumes execution. At block 2190, the process ends.

With reference to FIG. 2B, blocks 2030 to 2130, 2170, and 2190 are same as FIG. 2A. The difference is in the procedure utilized to clone the memory associated with the virtual machine, as illustrated in blocks 2290, 2310, 2330, and 2350. In the hosted product, the VMM can choose to represent the guest memory as a file on the host. At block 2290, the virtual machine's main memory image file is renamed to be associated with the snapshot. At block 2310, a new file is created on the host to represent guest memory for the first or original virtual machine. At block 2330, the clone is restored. At block 2350, a second file is created to represent guest memory of the second virtual machine and the clone resumes from S2 and continues execution. At block 2370, the first file is populated with demand paging and prefetching from the memory image file. At block 2371, the second file is populated with demand paging and prefetching from the memory image file.

With reference to FIG. 2C, blocks 2030 to 2050, 2070, and 2090 are same as FIG. 2A. The difference is in the procedure utilized to clone the memory associated with the virtual machine, as illustrated in blocks 2370, 2390, 2410, 2430, 2450, and 2470. At block 2370, the main memory pages are marked as copy-on-write (COW). At block 2390, a new file is created to back guest memory in the clone.

At block 2410, it is determined whether the original virtual machine has written to a page of the guest memory. If the original virtual machine has written to a page of the guest memory, then a COW fault is taken and the contents of the page are copied onto the clone's memory file, as illustrated in block 2430. At block 2450, it is determined whether the clone has read or written to a page of the guest memory. If the clone has read or written to a page of the guest memory, then a request is made by the clone to the virtual machine to copy the relevant page(s) to the clone's memory file, as illustrated in block 2470.

With reference to FIG. 2D, blocks 2030 to 2130, and 2190 are same as FIG. 2A. The difference is in the procedure utilized to clone the memory associated with the virtual machine, as illustrated in blocks 2490, 2510, 2530, and 2550. At block 2490, main memory pages of the virtual machine are marked as read-only. At block 2510, the vmkernel assigns a unique ID to the memory associated with the original VM.

The VMM of the clone associates itself to the memory associated with the original VM through the unique ID. At block 2530, it is determined whether the clone or the original virtual machine has written to the MPN. At block 2540, the vmkernel copies the contents of the MPN to a second MPN. At block 2550, the writer is supplied with the second MPN. Also, the subsequent writer can keep the original MPN.

Figure 3:
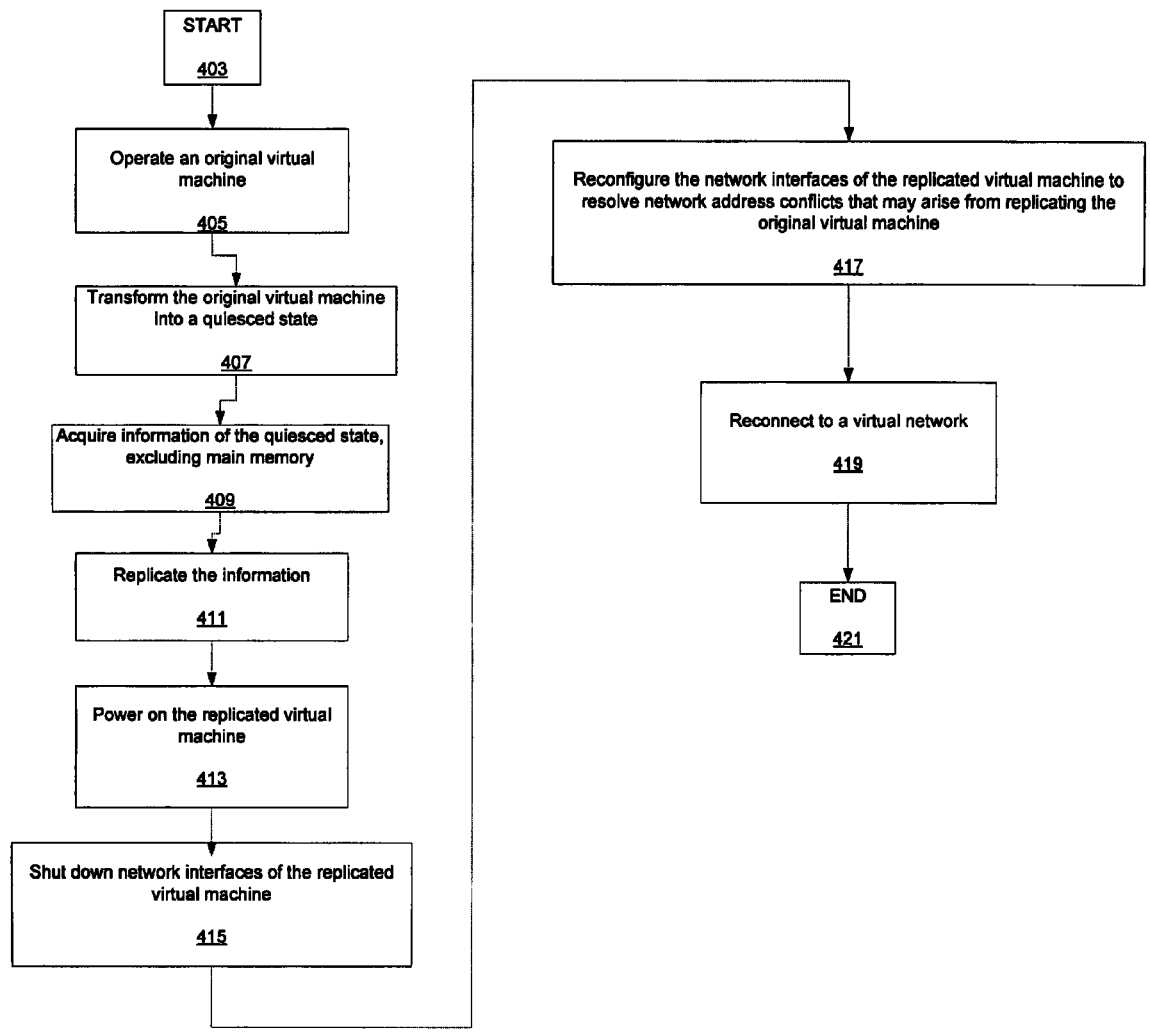
FIG. 3 illustrates flowchart of a real-time cloning method for replicating a virtual machine, upon which embodiments can be implemented.

FIG. 3 illustrates flowchart 401 of a real-time cloning method for replicating a virtual machine, upon which embodiments can be implemented. Although specific steps are disclosed in flowchart 401, such steps are exemplary. That is, embodiments are well suited to performing various other or additional steps or variations of the steps recited in flowchart 401. The steps in flowcharts 401 can be performed in orders different than presented.

At block 403, the process starts. At block 405, an original virtual machine is operated. At block 407, the original virtual machine is transformed into a quiesced state. In one embodiment, transforming includes suspending operations of the original virtual machine. In one embodiment, the quiesced state does not have ongoing I/O operations.

At block 409, information of the quiesced state is acquired, excluding main memory. In one embodiment, the original virtual machine continues to operate. At block 411, the information acquired is replicated.

At block 413, a replicated virtual machine is powered on. In one embodiment, the replicated virtual machine starts off with an internal state and files that are the same as those of the original virtual machine.

At block 415, network interfaces of the replicated virtual machine are shut down. At block 417, the network interfaces of the replicated virtual machine are reconfigured to resolve network address conflicts that may arise from replicating the original virtual machine. At block 419, the replicated virtual machine is reconnected to a virtual network. At block 421, the process ends.

Figure 4:
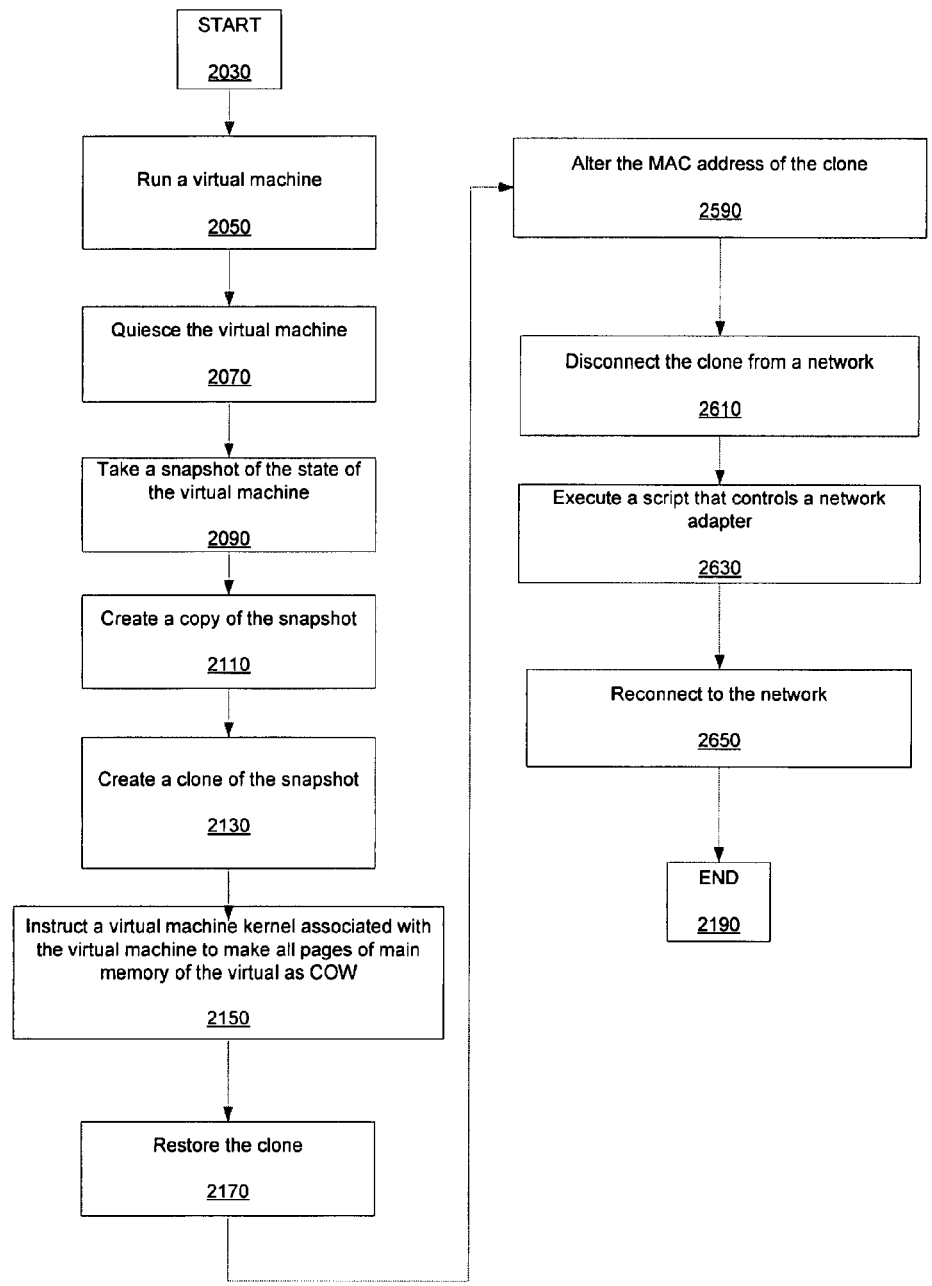
FIG. 4 illustrates flowcharts of methods for real-time cloning of a virtual machine, including altering the Media Access Control (MAC) address of the clone, upon which embodiments can be implemented.

With reference to FIG. 4, a method of addressing the MAC address problem of the clone is illustrated in blocks 2590, 2610, 2630, and 2650. At block 2590, the Media Access Control (MAC) address of the clone is altered. At block 2610, the clone is disconnected from a network. In one embodiment, the clone is moved to an isolated network with no connectivity. At block 2630, a script that controls a network adapter is executed to reinitialize the MAC address and IP address. At block 2650, the clone is reconnected to the network.

Figure 5:
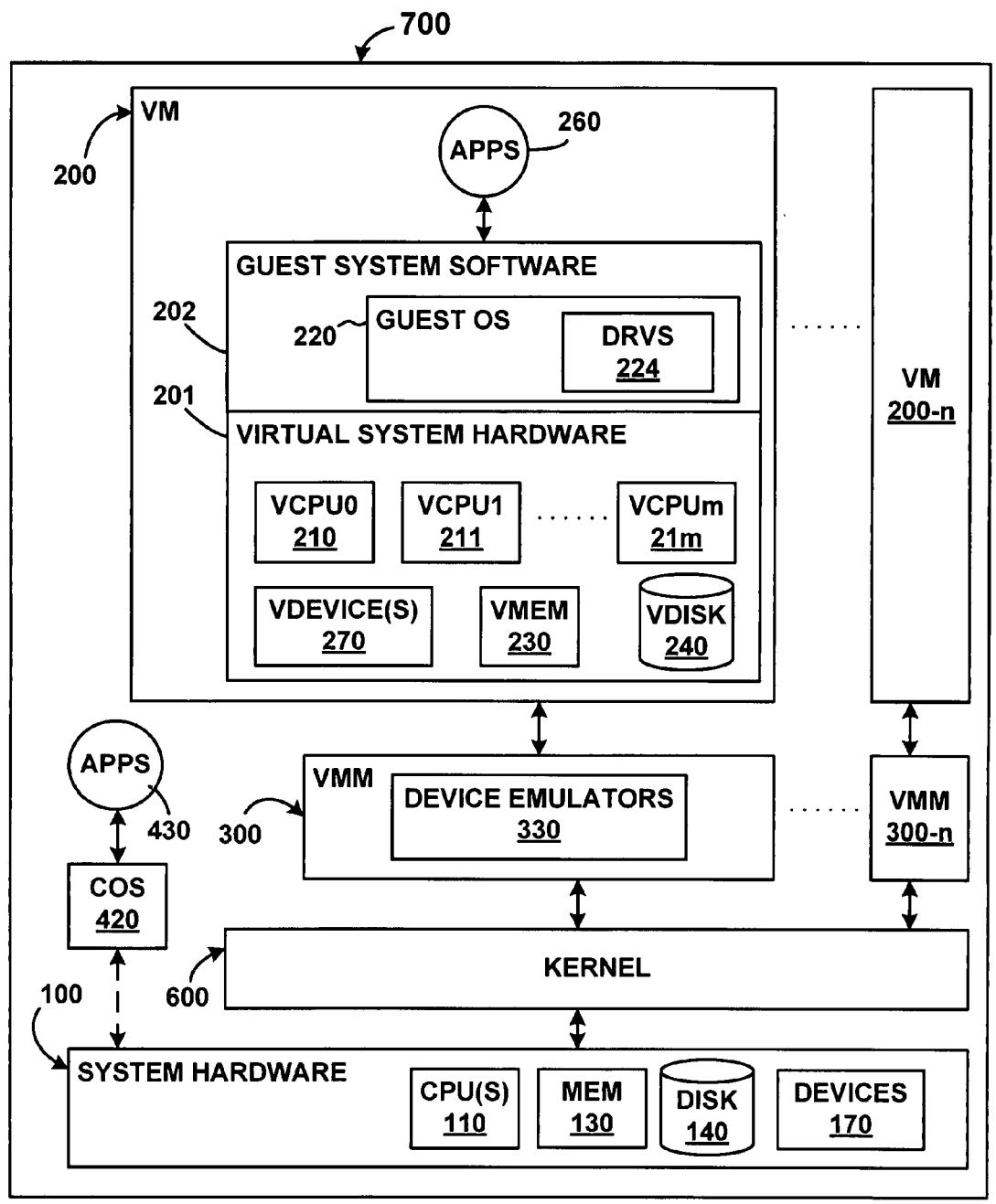
FIG. 5 illustrates an exemplary non-hosted virtual machine, upon which embodiments can be implemented.
Figure 6:
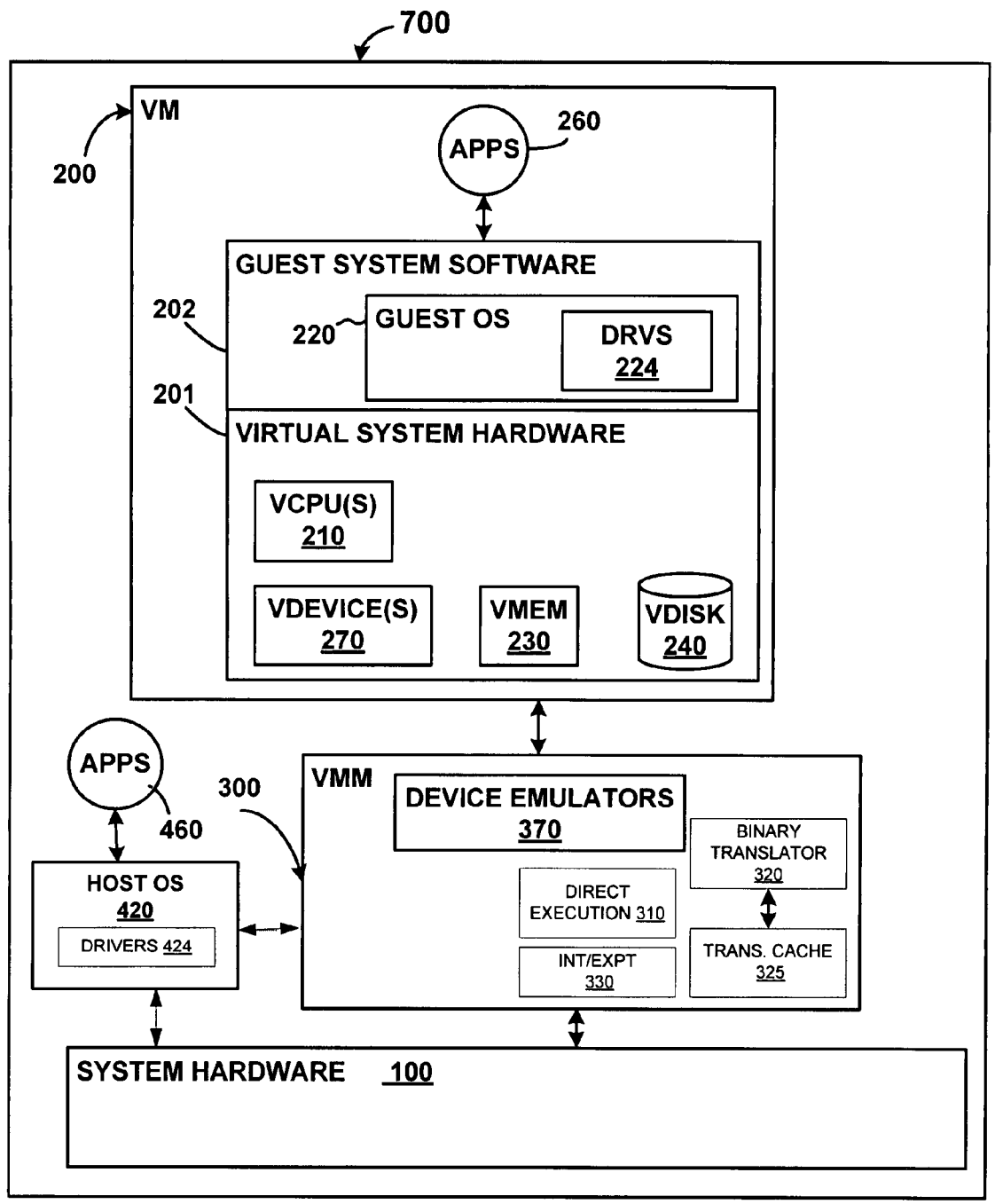
FIG. 6 illustrates an exemplary hosted virtual machine, upon which embodiments can be implemented.

FIGS. 5 and 6 show a virtual machine and its functions. As is well known in the field of computer science, a virtual machine (VM) is a software abstraction—a "virtualization"—of an actual physical computer system. FIG. 5 shows one possible arrangement of a computer system 700 that implements virtualization. A virtual machine (VM) 200, which in this system is a "guest," is installed on a "host platform," or simply "host," which will include a system hardware 100, that is, a hardware platform, and one or more layers or co-resident components comprising system-level software, such as an operating system (OS) or similar kernel (or hypervisor), a VMM, or some combination of these.

As software, the code defining the VM will ultimately execute on the actual system hardware 100. As in almost all computers, this hardware will typically include one or more CPUs 110, some form of memory 130 (volatile and/or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware vendors have proposed, and are presumably developing, hardware processors that include specific hardware support for virtualization.

Each VM 200 will typically mimic the general structure of a physical computer and as such will usually have both virtual system hardware 237 and guest system software 202. The virtual system hardware typically includes at least one virtual CPU 210, virtual memory 230, at least one virtual disk or storage device 240, and one or more virtual devices 270. Note that a storage disk—virtual 240 or physical 140—is also a "device," but is usually considered separately because of the important role it plays. All of the virtual hardware components of the VM may be implemented in software to emulate corresponding physical components. The guest system software typically includes a guest operating system (OS) 220 and drivers 224 as needed, for example, for the various virtual devices 270.

Similarly, a single VM may also have (that is, be exposed to) more than one virtualized processor. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 5, for example, illustrates multiple virtual processors 210, 119, ..., 21*m* (VCPU0, VCPU1, ..., VCPUm) within the VM 200. Each virtualized processor in a VM may also be multi-cored, or multi-threaded, or both, depending on the virtualization.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Applications may be installed within the VM in a conventional manner, using the guest OS. Then, the guest OS retrieves files required for the execution of such installed applications from the virtual disk in a conventional manner. The design and operation of virtual machines in general are known in the field of computer science.

Some interface is usually required between a VM 200 and the underlying host platform (in particular, the hardware CPU(s) 110 and any intermediate system-level software layers), which is responsible for actually submitting and executing VM-issued instructions and for handling I/O operations, including transferring data to and from the hardware memory 130 and storage devices 140. A common term for this interface or virtualization layer is a VMM, shown as component 300. A VMM is usually a software component that virtualizes at least some of the resources of the physical host machine, or at least some hardware resource, so as to export a hardware interface to the VM corresponding to the hardware the VM "thinks" it is running on. As FIG. 5 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in the VMM. One advantage of such an arrangement is that the VMM may (but need not) be set up to expose "generic" devices, which facilitate, for example, migration of VM from one hardware platform to another.

In contrast to a fully virtualized system, the guest OS 220 in a so-called "para-virtualized" system is modified to support virtualization, such that it not only has an explicit interface to the VMM, but is sometimes also allowed to access at least one host hardware resource directly. In some para-virtualized systems, one of a plurality of VMs plays a "superior" role in that it mediates some requests for hardware resources made by the guest operating systems of other VMs. In short, virtualization transparency is sacrificed to gain speed or to make it easier to implement the VMM that supports the para-virtualized machine.

In addition to the distinction between full and partial (para-) virtualization, two arrangements of intermediate system-level software layer(s) are in general use—a "hosted" configuration (illustrated in FIG. 6) and a non-hosted configuration (illustrated in FIG. 5). In a hosted virtualized computer system, an existing, general-purpose operating system forms a "host" OS that is used to perform certain input/output (I/O) operations, alongside and sometimes at the request and direction of the VMM 300. The host OS 420, which usually includes drivers 424 and supports applications 460 of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 6 also illustrates some of the other components that are also often included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320 with associated translation cache 325 may be included to provide execution speed while still preventing the VM from directly executing certain privileged instructions (see U.S. Pat. No. 6,397,242, Devine, et al., "Virtualization System Including a VMM for a Computer with a Segmented Architecture," 28 May 2002).

In many cases, it may be beneficial to deploy VMMs on top of a software layer—a kernel (or "hypervisor") 600—constructed specifically to provide efficient support for the VMs. This configuration is frequently referred to as being "non-hosted." Compared with a system in which VMMs run directly on the hardware platform (such as shown in FIG. 6), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as any temporary "console" operating system 420 that, in some systems, is included to boot the system as a whole and for enabling certain user interactions with the kernel. The console OS in FIG. 5 may be of the same type as the host OS in FIG. 6, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005.)

As a generalization, some form of "virtualization software" executes between system hardware 100 and one or more VMs 200. The virtualization software uses the resources of the system hardware 100, and emulates virtual system hardware 237, on which guest system software 202 and guest applications 260 appear to execute. Thus, virtualization software typically comprises one or more device emulators, and either includes or executes in conjunction with some form of system software for accessing and controlling the system hardware 100. The virtualization software may provide full virtualization or partial virtualization. In the non-hosted virtual computer system of FIG. 5, the virtualization software may be considered to comprise the VMMs 300, along with some portions of the kernel 600, such as one or more software modules that may share physical system resources between multiple VMs. The virtualization software operates in conjunction with system software that is also contained in the kernel 600. Similarly, in the hosted virtual computer system of FIG. 6, the virtualization software may be considered to primarily comprise the VMM 300, which operates in conjunction with system software in the form of the host OS 420. Various other configurations for virtualization software and system software are also possible.

There are further issues to be solved in cloning a VM other than merely creating a fast snapshot for the child VM. These are mostly related to unique identifiers in each guest operating system running in the VM—e.g., the MAC address for the network adapter, host name, security identifiers in windows guests, etc. The general way to solve these issues is to (optionally) execute a script in the guest prior to cloning to stop the service that we want to reconfigure, do the clone operation as described above, patch up both parent and child configuration files if necessary, and (optionally) execute a scrip in the guest to patch up guest state prior to resuming normal execution. The VMware tools running inside the guest can be used to execute any script or other code inside the guest.

This invention may be used to advantage in both a hosted and/or a non-hosted virtualized computer system, in which the included virtual machine(s) may be fully or para-virtualized, and in which the virtual machine(s) have any number of virtualized processors, which may be of any type (including multi-cored, multi-threaded, or some combination). The invention may also be implemented directly in a computer's primary OS, both where the OS is designed to support virtual machines and where it is not. Moreover, the invention may even be implemented wholly or partially in hardware, for example in processor architectures intended to provide hardware support for virtual machines.

To summarize, embodiments set forth methods and systems for cloning a virtual machine in real time. Specifically, embodiments allow an original virtual machine to be cloned in real time without interrupting or significantly impacting the performance of the original virtual machine. In one example, the clone runs on a different host computer system having an independent set of computing hardware. Hence, in the present example, the clone is created in real time, and upon creation, capable of running independently without draining the computing resources that support the original virtual machine. Thus, embodiments help to eliminate significant inefficiencies associated with cloning of a virtual machine.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A real-time cloning method for a virtual machine, said method comprising:
   running said virtual machine;
   creating a clone of said virtual machine while said virtual machine continues to run, said creating including:
   quiesceing said virtual machine;
   taking a snapshot of a state of said virtual machine while said virtual machine continues to run, wherein said first snapshot excludes the state of said virtual machine's main memory; and
   creating a copy of said snapshot;
   restoring said clone using said copy of said snapshot;
   renaming said virtual machine's main memory to a memory-image file of said snapshot;
   creating a first file to represent a first guest memory in said virtual machine as said virtual machine continues to execute;
   populating said first file with demand paging and prefetching from said memory-image file;
   creating a second file to represent a second guest memory for said clone; and
   populating said second file with demand paging and prefetching from said memory-image file.

2. The method of claim 1, further comprising:
   marking main memory pages of said virtual machine as read-only;
   supplying said clone with the same machine page number (MPN) as said virtual machine, wherein if said clone or said virtual machine writes to said MPN, then the contents of said MPN is copied to a second MPN, and wherein a writer is supplied with said second MPN.

3. The method of claim 1, further comprising:
   instructing a virtual machine kernel associated with said virtual machine to make all pages of main memory of said virtual machine as copy-on-write (COW), wherein an unique ID corresponding to said main memory is provided by said virtual machine kernel, and wherein an association between said unique ID and said main memory is made upon restoration of said clone.

4. The method of claim 1, further comprising:
   marking said main memory pages as copy-on-write (COW) in said virtual machine at the time of said snapshot; and
   creating a new file to back guest memory in said clone, wherein if said virtual machine writes to a page of said guest memory, then a COW fault is taken and the contents of said page are copied to said clone's memory file, and wherein if said clone reads or writes to a page of said guest memory, then a request is made by said clone to said virtual machine to copy the relevant page to said clone's memory file.

5. The method of claim 1, wherein said snapshot includes an associated configuration file and a saved state of said virtual machine.

6. The method of claim 1, wherein said snapshot creates a redo log.

7. The method of claim 1, further comprising:
   altering the Media Access Control (MAC) address of said clone;
   disconnecting said clone from a network;
   executing a script, wherein said script controls a network adapter; and
   reconnecting to said network.

8. The method of claim 1 further comprises moving the clone to an isolated network with no connectivity.

9. A hot cloning method for replicating a virtual machine, said method comprising:
   executing a parent virtual machine;
   temporarily pausing I/O operations of said parent virtual machine;
   capturing state information of said parent virtual machine while said parent virtual machine continues to run, wherein said captured state information excludes state information of said parent virtual machine's main memory;
   creating a copy of said captured state information;
   generating a child virtual machine associated with said parent virtual machine with said copy of said captured state information;
   resuming said child virtual machine;
   renaming a main memory of said parent virtual machine to a memory-image file of said captured state information;
   creating a first file to represent a first guest memory in said parent virtual machine as said parent virtual machine continues to execute;
   populating said first file with demand paging and prefetching from said memory-image file;
   creating a second file to represent a second guest memory for said child virtual machine; and
   populating said second file with demand paging and prefetching from said memory-image file.

10. The method of claim 9, wherein said main memory is managed by a custom kernel.

11. The method of claim 9 further comprising:
    invoking a script on said child virtual machine to modify a configuration of said child virtual machine.

12. A non-transitory computer-readable medium having computer-executable instructions for performing steps comprising:
    operating an original virtual machine;
    transforming said original virtual machine into a quiesced state;
    acquiring information of said quiesced state while said original virtual machine continues to run, excluding main memory, of said original virtual machine, wherein said original virtual machine continues to operate;
    replicating said information, wherein said information is utilized to form a replicated virtual machine;
    powering on said replicated virtual machine;
    renaming a main memory of said parent virtual machine to a memory-image file of said captured state information;
    creating a first file to represent a first guest memory in said parent virtual machine as said parent virtual machine continues to execute;
    populating said first file with demand paging and prefetching from said memory-image file;
    creating a second file to represent a second guest memory for said child virtual machine; and
    populating said second file with demand paging and prefetching from said memory-image file.

13. The non-transitory computer-readable medium of claim 12, wherein the steps further comprises:

shutting down network interfaces of said replicated virtual machine;
reconfiguring said network interfaces to resolve network address conflicts that may arise from replicating said original virtual machine; and
reconnecting to a virtual network.

14. The non-transitory computer-readable medium of claim 12, wherein said replicated virtual machine starts off with an internal state and files that are the same as those of said original virtual machine.

15. The non-transitory computer-readable medium of claim 12, wherein said transforming further comprises suspending operations of said original virtual machine.

16. The non-transitory computer-readable medium of claim 12, wherein said quiesced state does not have ongoing I/O operations.

17. A real-time cloning method for a virtual machine, said method comprising:
running said virtual machine;
creating a clone of said virtual machine while said virtual machine continues to run, said creating including:
quiesceing said virtual machine;
taking a snapshot of a state of said virtual machine while said virtual machine continues to run, wherein said first snapshot excludes the state of said virtual machine's main memory; and
creating a copy of said snapshot;
restoring said clone using said copy of said snapshot;
marking said main memory pages as copy-on-write (COW) in said virtual machine at the time of said snapshot; and
creating a new file to back guest memory in said clone, wherein if said virtual machine writes to a page of said guest memory, then a COW fault is taken and the contents of said page are copied to said clone's memory file, and wherein if said clone reads or writes to a page of said guest memory, then a request is made by said clone to said virtual machine to copy the relevant page to said clone's memory file.

18. A real-time cloning method for a virtual machine, said method comprising:
running said virtual machine;
creating a clone of said virtual machine while said virtual machine continues to run, said creating including:
quiesceing said virtual machine;
taking a snapshot of a state of said virtual machine while said virtual machine continues to run, wherein said first snapshot excludes the state of said virtual machine's main memory; and
creating a copy of said snapshot;
restoring said clone using said copy of said snapshot;
altering the Media Access Control (MAC) address of said clone;
disconnecting said clone from a network;
executing a script, wherein said script controls a network adapter; and
reconnecting to said network.

19. A real-time cloning method for a virtual machine, said method comprising:
running said virtual machine;
creating a clone of said virtual machine while said virtual machine continues to run, said creating including:
quiesceing said virtual machine;
taking a snapshot of a state of said virtual machine while said virtual machine continues to run, wherein said first snapshot excludes the state of said virtual machine's main memory; and
creating a copy of said snapshot;
restoring said clone using said copy of said snapshot;
shutting down network interfaces of said clone;
reconfiguring said network interfaces to resolve network address conflicts that may arise from cloning said virtual machine; and
reconnecting to a virtual network.

20. A hot cloning method for replicating a virtual machine, said method comprising:
executing a parent virtual machine;
temporarily pausing I/O operations of said parent virtual machine;
capturing state information of said parent virtual machine while said parent virtual machine continues to run, wherein said captured state information excludes state information of said parent virtual machine's main memory;
creating a copy of said captured state information;
generating a child virtual machine associated with said parent virtual machine with said copy of said captured state information;
resuming said child virtual machine;
marking said main memory pages as copy-on-write (COW) in said parent virtual machine at the time of said capturing of said state information of said parent virtual machine; and
creating a new file to back guest memory in said child virtual machine, wherein if said parent virtual machine writes to a page of said guest memory, then a COW fault is taken and the contents of said page are copied to said child virtual machine's memory file, and wherein if said child virtual machine reads or writes to a page of said guest memory, then a request is made by said child virtual machine to said parent virtual machine to copy the relevant page to said child virtual machine's memory file.

21. A hot cloning method for replicating a virtual machine, said method comprising:
executing a parent virtual machine;
temporarily pausing I/O operations of said parent virtual machine;
capturing state information of said parent virtual machine while said parent virtual machine continues to run, wherein said captured state information excludes state information of said parent virtual machine's main memory;
creating a copy of said captured state information;
generating a child virtual machine associated with said parent virtual machine with said copy of said captured state information;
resuming said child virtual machine;
altering the Media Access Control (MAC) address of said child virtual machine;
disconnecting said child virtual machine from a network;
executing a script, wherein said script controls a network adapter; and
reconnecting to said network.

22. A hot cloning method for replicating a virtual machine, said method comprising:
executing a parent virtual machine;
temporarily pausing I/O operations of said parent virtual machine;
capturing state information of said parent virtual machine while said parent virtual machine continues to run, wherein said captured state information excludes state information of said parent virtual machine's main memory;

creating a copy of said captured state information;

generating a child virtual machine associated with said parent virtual machine with said copy of said captured state information;

resuming said child virtual machine;

shutting down network interfaces of said child virtual machine;

reconfiguring said network interfaces to resolve network address conflicts that may arise from replicating said virtual machine; and reconnecting to a virtual network.

23. A non-transitory computer-readable medium having computer-executable instructions for performing steps comprising:

operating an original virtual machine;

transforming said original virtual machine into a quiesced state;

acquiring information of said quiesced state while said original virtual machine continues to run, excluding main memory, of said original virtual machine, wherein said original virtual machine continues to operate;

replicating said information, wherein said information is utilized to form a replicated virtual machine;

powering on said replicated virtual machine;

marking said main memory pages as copy-on-write (COW) in said original virtual machine at the time of said acquiring of said information of said quiesced state; and creating a new file to back guest memory in said replicated virtual machine, wherein if said original virtual machine writes to a page of said guest memory, then a COW fault is taken and the contents of said page are copied to said replicated virtual machine's memory file, and wherein if said replicated virtual machine reads or writes to a page of said guest memory, then a request is made by said replicated virtual machine to said original virtual machine to copy the relevant page to said replicated virtual machine's memory file.

24. A non-transitory computer-readable medium having computer-executable instructions for performing steps comprising:

operating an original virtual machine;

transforming said original virtual machine into a quiesced state;

acquiring information of said quiesced state while said original virtual machine continues to run, excluding main memory, of said original virtual machine, wherein said original virtual machine continues to operate;

replicating said information, wherein said information is utilized to form a replicated virtual machine;

powering on said replicated virtual machine;

altering the Media Access Control (MAC) address of said replicated virtual machine;

disconnecting said replicated virtual machine from a network;

executing a script, wherein said script controls a network adapter; and reconnecting to said network.

25. A non-transitory computer-readable medium having computer-executable instructions for performing steps comprising:

operating an original virtual machine;

transforming said original virtual machine into a quiesced state;

acquiring information of said quiesced state while said original virtual machine continues to run, excluding main memory, of said original virtual machine, wherein said original virtual machine continues to operate;

replicating said information, wherein said information is utilized to form a replicated virtual machine;

powering on said replicated virtual machine;

shutting down network interfaces of said replicated virtual machine;

reconfiguring said network interfaces to resolve network address conflicts that may arise from replicating said original virtual machine; and reconnecting to a virtual network.

* * * * *